(12) United States Patent
Leijon et al.

(10) Patent No.: US 12,489,674 B2
(45) Date of Patent: Dec. 2, 2025

(54) CONNECTING SERVICE LEVEL OUTPUTS TO ORCHESTRATION INPUTS

(71) Applicant: Cisco Technology, Inc., San Jose, CA (US)

(72) Inventors: Viktor Mats Emanuel Leijon, San Jose, CA (US); Arghya Mukherjee, Acton, MA (US); Ian James Wells, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/647,854

(22) Filed: Apr. 26, 2024

(65) Prior Publication Data

US 2025/0337640 A1    Oct. 30, 2025

(51) Int. Cl.
*H04L 41/0806* (2022.01)
*H04L 41/14* (2022.01)
*H04L 47/125* (2022.01)

(52) U.S. Cl.
CPC .......... *H04L 41/0806* (2013.01); *H04L 41/14* (2013.01); *H04L 47/125* (2013.01)

(58) Field of Classification Search
CPC .............................. H04L 41/0806; H04L 41/14
See application file for complete search history.

(56) References Cited

U.S. PATENT DOCUMENTS

| | | | |
|---|---|---|---|
| 10,567,288 B1* | 2/2020 | Mutnuru | H04L 67/1019 |
| 10,749,785 B1* | 8/2020 | Thangavel | H04L 43/0864 |
| 11,687,355 B1 | 6/2023 | Mukherjee et al. | |
| 12,199,825 B2* | 1/2025 | Kumar | H04L 41/0806 |
| 2017/0093681 A1* | 3/2017 | Chaubey | H04L 41/0806 |
| 2017/0104609 A1* | 4/2017 | Mcnamee | H04L 41/0894 |
| 2019/0349421 A1 | 11/2019 | Schincariol et al. | |
| 2020/0097339 A1 | 3/2020 | Carlen et al. | |
| 2020/0322218 A1* | 10/2020 | Anwer | H04L 41/0866 |
| 2022/0078093 A1 | 3/2022 | Bruun, III et al. | |
| 2022/0201447 A1 | 6/2022 | Asawa et al. | |
| 2022/0286360 A1* | 9/2022 | Gali | H04L 41/40 |
| 2023/0412687 A1* | 12/2023 | Kim | H04L 9/0891 |

(Continued)

FOREIGN PATENT DOCUMENTS

| | | | | | |
|---|---|---|---|---|---|
| CN | 106953737 B | * | 11/2020 | ......... | H04L 41/0806 |
| CN | 115801669 A | * | 3/2023 | ......... | H04L 12/4625 |
| CN | 115918139 A | * | 4/2023 | ......... | H04L 41/0816 |

(Continued)

*Primary Examiner* — Umar Cheema
(74) *Attorney, Agent, or Firm* — Lee & Hayes, P.C.

(57) ABSTRACT

This technology defines an envelope of a set of constraints to impose a network characteristic. A function is created to form a combined set of envelopes to configure resources for use in the network. A path is discovered from a first state to a second state based on the combined set of envelopes. A set of service descriptors configures the function based on a load demand for the network. A path selection is tested of a set of envelopes against the load demand for the network. The set of constraints of a path selection is determined as to whether the load demand is met demand. In response to a set of envelopes meeting the load demand, a path selection is enabled for a set of constraints defined by the set of envelopes, else if the load demand is not met, then an error message is returned to the network provider.

20 Claims, 6 Drawing Sheets

(56) References Cited

U.S. PATENT DOCUMENTS

2024/0220389 A1* 7/2024 Wu ..................... H04L 41/0686
2024/0236443 A1* 7/2024 Hinds ..................... G06T 19/00

FOREIGN PATENT DOCUMENTS

| CN | 117336175 A | * | 1/2024 | ............ H04L 41/08 |
| CN | 117692360 A | * | 3/2024 | |
| WO | WO-2023091036 A1 | * | 5/2023 | ........... G06F 1/3228 |
| WO | WO-2025062464 A1 | * | 3/2025 | |

* cited by examiner

CONNECTING SERVICE LEVEL OUTPUTS TO ORCHESTRATION INPUTS

TECHNICAL FIELD

This disclosure relates in general to the field of communications and more particularly to, methods and systems for system deployment by a network planner using techniques for system instantiation and service orchestration.

BACKGROUND

A system that may be operated by a Network Service Provider (NSP) can be characterized in two different contexts that comprise an application producer (e.g., a vendor) that may create or produce a generic application with the specific knowledge of the application usage in an operational context, and an application user (e.g., the operator) who possesses the knowledge about the demands (and other usage requirements) of a specific operating system (e.g., operating environment) in which the system is operating but would not have detailed knowledge of a set of operating application limits or constraints.

As an example, the first domain, the network planning domain may include user-based systems (e.g., manual planning) or automated systems (e.g., Artificial Intelligence (AI)/Machine Learning (ML) algorithms) planner may require inputting of information of a set of services specified to the network or business. This may entail defining an operational envelope of a system that is composed of a set of service-level objectives that align with the system, and include allocating costs, and constraints that are being enforced in a specified network context in operation. In an implementation, a network planner of this domain may be tasked with making decisions based on external observations of system operations and may receive instructions from agents or third parties associated with the service to be provided.

In the example, the second domain, the system design may include entities that oversee the creation and design aspects of the system. For example, system designers have contextual know-how of how a system functions and responds to varying operational conditions and constraints but may have limited contextual knowledge a priori in a network planned deployment; in other words, may formulate instructions based on an inside-out view of the system planned. Both domains may represent the combining of disparate types of knowledge in a planned deployment of a set of parties of the system vendor and the service provider.

Network Service Providers (NSPs) require planning solutions to optimize network load demands for connectivity and to cope with resource constraints. More functionalities may be configured in Network Function Virtualization (NFV) enabled networks. Software-defined Defined Networking (SDN) and Network Function Virtualization (NFV) provide network operators with different schemas to deploy services using a software-centric service model. To better enable the implementation of this model, there is a need for better tools to configure the end-to-end service which can include the ability to abstract and automate the control of physical and virtual resources delivering or orchestrating a service. The coordination of a set of activities behind such a process may be referred to as the orchestration by automatically selecting and controlling multiple resources, services, and systems to meet certain customer-requested network services.

It is desirable to address the requirement of a network planner to enhance the delivery of a set of orchestrated solutions that may correspond to changes that occur in the state of the system that result from a set of different service operations being performed at various service levels of the system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
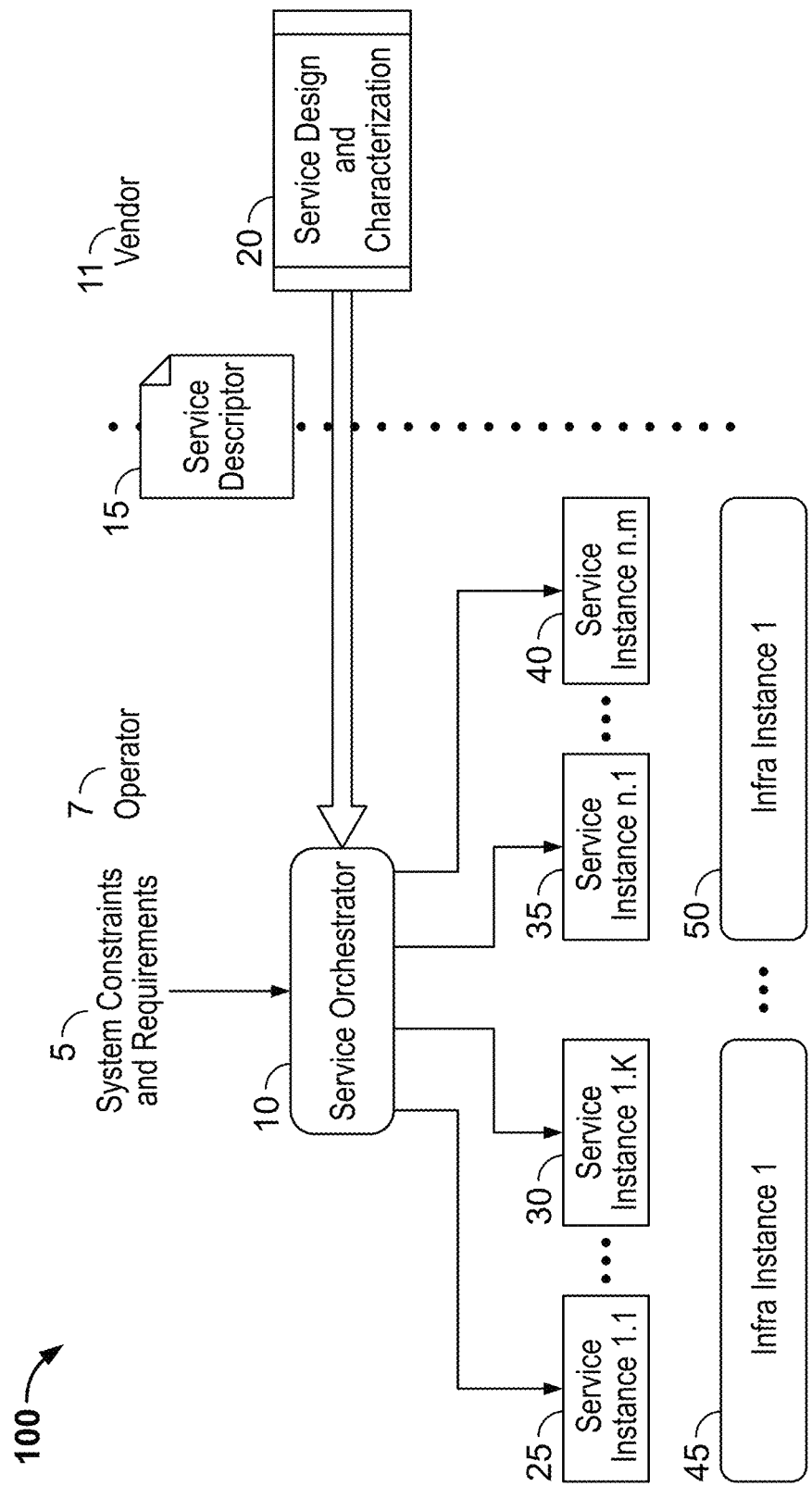
FIG. 1 illustrates a service level diagram of an exemplary method for connecting a set of service level outputs to a set of orchestrated inputs when deploying a model of a network that implements a set of envelopes to encapsulate transitions of states of the system associated with a set of operating constraints for the network according to some embodiments.

To implement an efficient network configuration at the onset, the Network Service Provider (NSP) in the network planning domain (e.g., the network planner) must consider a future or predicted set of requirements to configure the system. In other words, the network planner may be required to answer the following types of exemplary questions and consider various likely scenarios during the initial configuration and system deployment. For example, the network planner likely will consider what resources the system requires to provide the network with a service at a specific service level. Other considerations include: How would the system's service levels change if the resources were to be modified to meet the expected resource configurations? How would the resource requirement and service levels change if the system's operation were modified? The consideration may extend to service operations that take place during and after a change or modification takes place.

Containerization may be defined as a solution that implements a lightweight operating system (OS) equipped with ready-to-deploy application components and is packaged into a self-sufficient container ready to run on a host machine that supports multi-tenancy. In the host system, different containers run together on the same host OS and in the same Kernel, which helps reduce storage requirements and allows them to achieve near-native performance compared to the host OS. When containers are being deployed on a large scale, there may be required a complex set of container orchestration by a platform for achieving automated deployment, management, and scaling. Amongst various orchestration platforms, KUBERNETES® may be considered a de facto standard that supports packaged and executable containerized applications, workloads, and services, and a framework for operating scalable distributed systems, that may be implemented in the deployment of the described cloud computing system.

Elastic scalability is a technique that can be deployed and enabled in cloud computing using a container-based configuration for a fast bootstrap, with higher performance achieved by lowering the provisioning time to provision a new cluster and properly configure it with the required container orchestration support. Elastic scalability may be employed with the described envelope architecture of the cloud computing system herein.

As container clusters are increasingly being deployed over multiple services from different cloud providers, managing and monitoring cloud applications across the entire service areas of an organization is more challenging. In a deployment, Helm (e.g., a Helm chart) is a de-facto standard that automates the creation, packaging, and deployment of Kubernetes applications by combining a user specific set of configuration files into a single reusable package. For modeling cloud applications, there are several options: Topology and Orchestration Specification for Cloud Applications (TOSCA) is a modeling language to describe a topology of cloud-based web services of cloud applications, their relationships, and the processes that manage them; Other modeling language options include CAMEL (Cloud Application Modelling and Execution Language), CAML (Cloud Application Modeling Language), Cloud ML (Could Modeling Language), and container platform-native DSLs (Domain-Specific Languages). The described envelope architecture may be considered agnostic as to the particular modeling language that is to be used.

The standard Internet Engineering Task Force (IETF) interoperable cloud application is the TOSCA cloud application which is used to specify a static configuration of a network that may link to a static set of requirements. However declarative or procedure-based methods require devolving or transferring into command-based systems are not achievable using TOSCA's as it is a static configuration that does not provide a translation of a result that may be required into a set of actions that can be executed to change or transition the state of the system. In other words, TOSCA has drawbacks and is unable to adequately address transitional operation changes that are needed in complex network planning deployments.

As an example, the network planner without being able to translate results into actions, makes the effects using declarative methods (specified in terms of actions only) that are opaque and therefore unpredictable. For example, if a change in the state of a container system is needed so that a container can be executed using a different image; in this instance, it is clear that the previous container that is being executed is using a previous image will be terminated and will be replaced with a container executing a new image. In another example, if a new container is initialized, the old container in use will be terminated, or a delay may be configured after terminating the old container, prior to initializing a new container (e.g., "I'm going to kill the old container, wait ten hours, and start the new one"). The exemplary actions are permissible and provide state transitions of container-based methods that are being transitioned towards a desired state. The transitioning of the states in the described transition processes may differ in the number of resources and time consumed by a system and are not reducible to a singular unitary state (i.e., cannot be considered atomic in which each can seamlessly find itself in a new state without transitioning through one or more undefined, unexpected states in a pipeline process flow process.

Overview

The present disclosure describes techniques for system deployment for a network planner by providing techniques for service orchestration when deploying the system to correlate an initial set of changes (e.g., updates) made to a state of the system with a set of effects that are predicted based on service levels being offered by the system.

In some embodiments, the present disclosure describes methods and systems for characterizing a service that is delivered as a function of instantiation or input parameters. The service characterization can include a set of equations that device a service level, which is implemented by connecting service level outputs to an orchestration of inputs for deploying a model of service operations. The model of service operations is characterized by a set of parametric descriptors of the outputs that associate an input or a set of inputs to a set of service-level outputs. The set of parametric descriptors enables the modeling of state changes in service operations or functions which are defined in one or more envelopes that include the state changes.

In some embodiments, an envelope may include or be characterized as a set of constraints (e.g., operational constraints) within which one or more state changes may be required and where a particular state change may comprise a set of operations that models a transition between states and a set of functions that expresses a relationship between an output service level indicator and one or more input resources of a system both during and after each operation. In some embodiments, a function may be created by combining multiple change envelopes to determine the envelope for the entire system where the combined envelope of the change is within a set of defined operational constraints. In an embodiment, a producer of a service (e.g., a vendor as an example) may measure and characterize the service, and then encode the relationship between the service level objectives as a function of input parameters (with a set of permissible operations) within the service descriptors. The service descriptor is transferred to the service orchestrator that performs orchestration functions of analyzing the service descriptor and storing internal representations. Further, the steps of capturing requirements, modeling a service model, configuring the system based on transition time estimates, and defining the service between endpoint networks are performed to enable a causal model for a generic network service.

In some embodiments, the vendor characterizes the service and encodes the relationship of the service level objectives as a function of input parameters in every or most of the operations that are permissible in the system or network. The encoded relationship is represented in a service descriptor, and the service descriptor is transferred (via a continuous integration and continuous deployment (CI/CD) pipeline or an analogous process) to a service orchestrator delivering the end-to-end service. In an embodiment, the service orchestrator may analyze the service descriptor, and store an internal representation of the service.

The service orchestrator receives one or more inputs that comprise current system constraints, load demand, and usage requirements for the service and executes a series of service instances using operations and functions provided in the service descriptor. In some examples, the service instances executed by the service orchestrator are modified or changed using operations and/or functions that have been described in the service descriptor. If no operational path can be discovered in the network by the service orchestrator that is possible to meet a set of system requirements that are defined by one or more envelopes (each envelope may include a set of service descriptors for the load demand and usage requirements and/or current system constraints), then the service orchestrator will return a notice of an error (E.g., an error message).

The system orchestrator may also be configured to not only cause the return of an error message but to also revert to using a default configuration of one or more service instances, a prior configuration of one or more service instances, or some nearest matched (approximated) configuration of service instances. In other embodiments, the error message may include notice of proposed operational paths or a proposed operational path that is to be used as an alternative based on an optimum operational path not being discovered, and the proposed operational path meeting a limited set of constraints.

These and other aspects, objects, features, and advantages of the examples will become apparent to those having ordinary skill in the art upon consideration of the following detailed description of illustrated examples.

EXAMPLE EMBODIMENTS

Turning now to the drawings, in which like numerals indicate like (but not necessarily identical) elements throughout the figures, examples are described in detail.

FIG. 1 illustrates a service level diagram depicting a method for connecting service level outputs to orchestrated inputs for deploying a model of a network that uses an envelope of transitions of states of the system with a set of operating constraints for the network according to some embodiments. FIG. 1 illustrates a formal, declarative method to specify the effects of transitions in a system to the service levels of the system that can be used to determine optimal resource allocation and operational sequences to help orchestrate the system while maintaining an envelope of service level objectives.

In some embodiments, FIG. 1, shows a network of an operating environment 100 for a vendor 11 communicating with an operator 7 to configure a network service architecture that may be used to deploy a model that characterizes the parameters in a service being delivered to the operator 7 from the vendor 11. In some examples, the service design and characterization 20 that is created is defined by a set of service descriptors 15 that configure one or more functions orchestrated by a service orchestrator 10. In some embodiments created by combining multiple changes or transition envelopes to determine an envelope for the entire system, a combined envelope presents a set of defined operational constraints for the entire system.

As depicted in FIG. 1, the example operating environment 100 comprises vendor 11 communicating with operator 7 to instantiate a set of service descriptors, the set of service descriptors 15 are transferred (via a continuous integration or continuous deployment (CI/CD)) flow process) to the service orchestrator 10. The service orchestrator 10 analyzes the service descriptor and stores an internal representation of the service. The service orchestrator 10 takes the input of current system constraints and requirements for the service and brings up or modifies instances of the service using the operation and functions provided in the service descriptor 15 based on inputted information of the service design and characterization 20 that is the characterized service by a vendor and encodes the relationship of the service objectives as a function of the input parameters that include the system constraints and requirements 5 from the operator 5, and it is in every operation permissible to the system and the encoded om the service descriptor 15.

The service operations from the orchestrator 10 deploy a set of service instances of service instance 1.1 (25) to service instance 1.k (30) of an intra instance 1 (45). Similarly, another set of service instances of service instance n.1 (35) to service instance n.m (40) of an intra instance n (50) is deployed. In an embodiment, the output of the infra instance 1 (45) from a deployed model is outputted from a given input and corresponds to a parametric descriptor set of the service descriptors 15. In an embodiment, the model is enabled by state changes that define an envelope of what occurs with the change. The envelope (as described in FIG. 2) may enable a set of transitions for the changes that include a set of states of the system that can be represented by (i) a set of operations that transitions between the states; (ii) a set of functions that expresses the relationship between the output service level indicators and the input resources of the system both during and after each operation. Also, a function may be created by combining multiple change envelopes to determine the envelope for the entire system. The combined envelope of the change is within a set of defined operational constraints.

In some embodiments, the service orchestrator 10 may be configured to capture when deploying the model with the parametric descriptions, a set of requirements using declarations for shared resources. The service orchestrator 10 may perform the modeling of the state changes that define an envelope of transitional changes as a service model which may consist of two levels, at one level that is a cluster level and at another level that is a client service level. The service orchestrator 10 based on the input of the service design and characterization 20 may configure the system to estimate the time it takes for a transition. Also, the service design and characterization 20 may define a service as a VPN connection between two network endpoints, or the instantiation of a router or a firewall in a container; and enable a causal model for a generic network service, which can be interpreted and translated into actions by a generic network controller.

In an example, a captured requirement for a shared resource using a declaration by the service orchestrator 10 may consist of a physical CPU resource that may be over-subscribed, or link bandwidth for a service that is not reserved but may fluctuate over time. The applicable modeling in this case would be a service model which at the two levels would consist of at the cluster level, an overall resource model that might be over-subscribed, and at the client service level, a request of the resources needed and whether the requested number of resources could be over-subscribed. In an implementation, the cluster-level descriptor equation may include an indicator of how much the oversubscription would be, and whether the applications are exceeding that limit or not.

Figure 2:
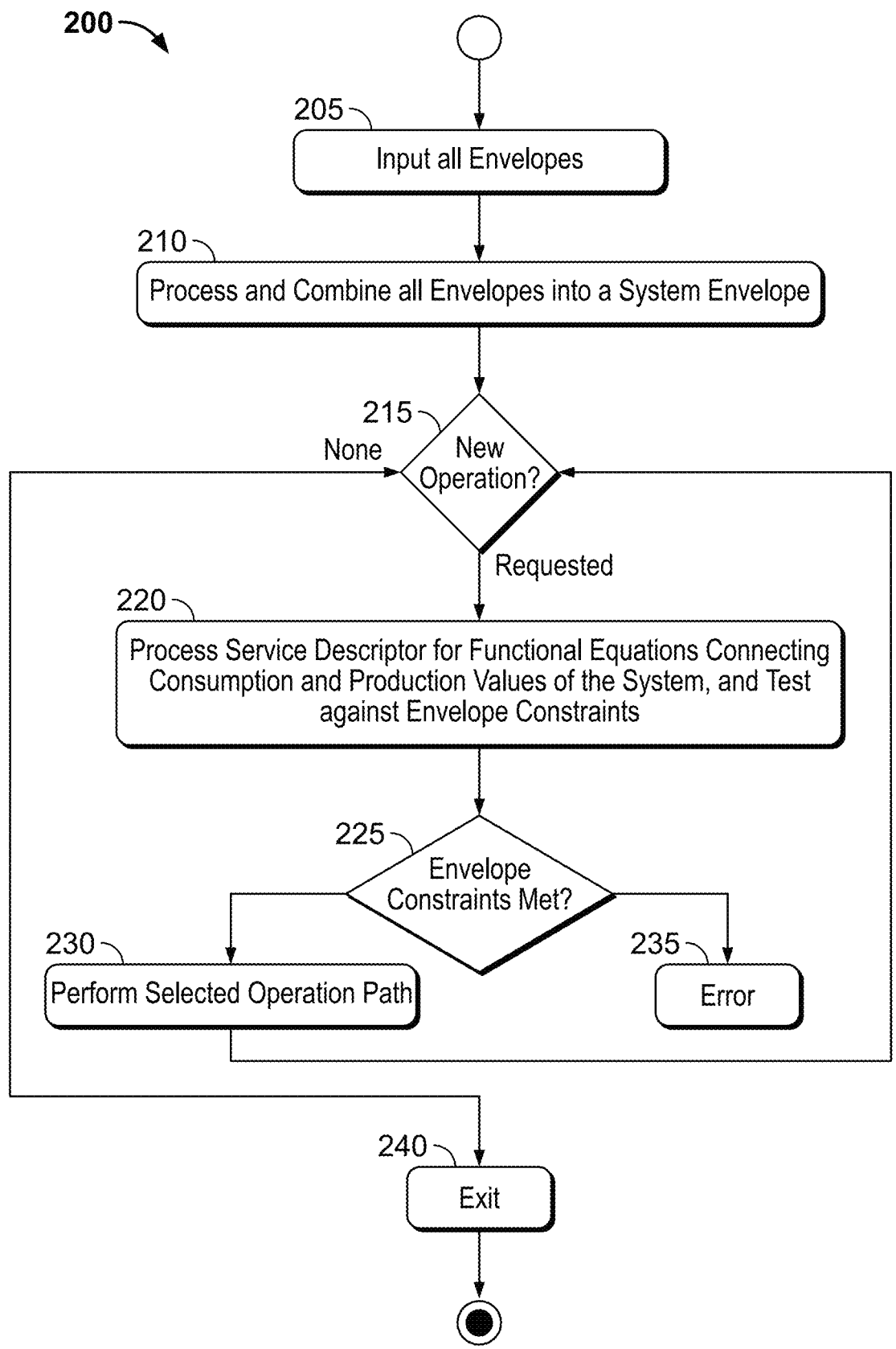
FIG. 2 illustrates a flow diagram of an exemplary envelope system used in FIG. 1 that supports a level of resource usage for consumption by the system according to some embodiments.

FIG. 2 illustrates a flow diagram of an exemplary envelope system that supports a level of resource usage for consumption by the system according to some embodiments. Method 200 is described with reference to the components illustrated in FIG. 1 of the service level diagram that connects service level outputs to orchestrated inputs to deploy a model of a network. In FIG. 2, a set of operational steps of a processing pipeline of method 200 for a network service characterization that defines a service level of a function of instantiation parameters of the network of the operating environment 100 is described. At step 205, a sequence or series of envelopes that define paths modeled by parametric descriptors is inputted to a service orchestrator 10 for delivering a set of service operations for different service instances 1.1 . . . 1.k. and service instances n.1 . . . n.m. The inputted envelopes in step 205 consist of all or nearly all the envelopes that have been defined by the service design and characterization 20. In some embodiments, an envelope may be defined as a set of constraints that are imposed on the measurable characteristic of a network system. The characteristic that is imposed may be viewed from a first perspective of what the system (e.g., the service orchestrator) may consume, and from a second perspective of what the system produces.

In some embodiments, operator 7 may configure a set of system constraints and requirements 5 for input to the service orchestrator 10 in one or more envelopes. For example, operator 7 may choose to create an envelope E1 that defines the maximum number of virtual CPUs (vCPUs) consumed by the system. For example, E1-24. Similarly, another envelope E2 created would be for the minimum Transactions Per Second (TPS) supported or produced by the system, for example, E2=100 TPS. At step 210, a resultant system envelope is created that is a combination of the envelopes. In this case, the example system envelope would be for the system to be able to support E1 and E2 concurrently. Therefore, in this instance, a system envelope E(1,2) would be capable of producing a minimum of 100 TPS while consuming a maximum of 24 vCPUs. At step 210, the processing pipeline may process all available envelopes and combine one or more envelopes into a system envelope. At step 215, a new operation may be requested by the service orchestrator 10. In this case, the new operation would entail at step 220, processing one or more service descriptors 15 from a vendor 11 by creating functional equations connecting the consumption and production values of the system and testing the functional equations against one or more envelope constraints. At step 225, a determination is made by the service orchestrator 10, whether the envelope constraints have been met. If a viable path is determined to be possible, then the service orchestrator 10 at step 230 performs a selected path operation. If a viable path cannot be discovered, then at step 235, an error is returned to the service orchestrator 10. Once the selected operation path is performed at step 230, the flow returns to step 215 to check whether another new operation is to be performed. If all the operations have been performed, then the process flow exits at step 240. Alternately if a new operation is to be processed, then flow returns to step 220 to process the service descriptor for functional equations connecting consumption and production values of the system and to test against envelope constraints. In this way, all the new operations that have been requested are processed individually (via a round-robin methodology).

Figure 3:
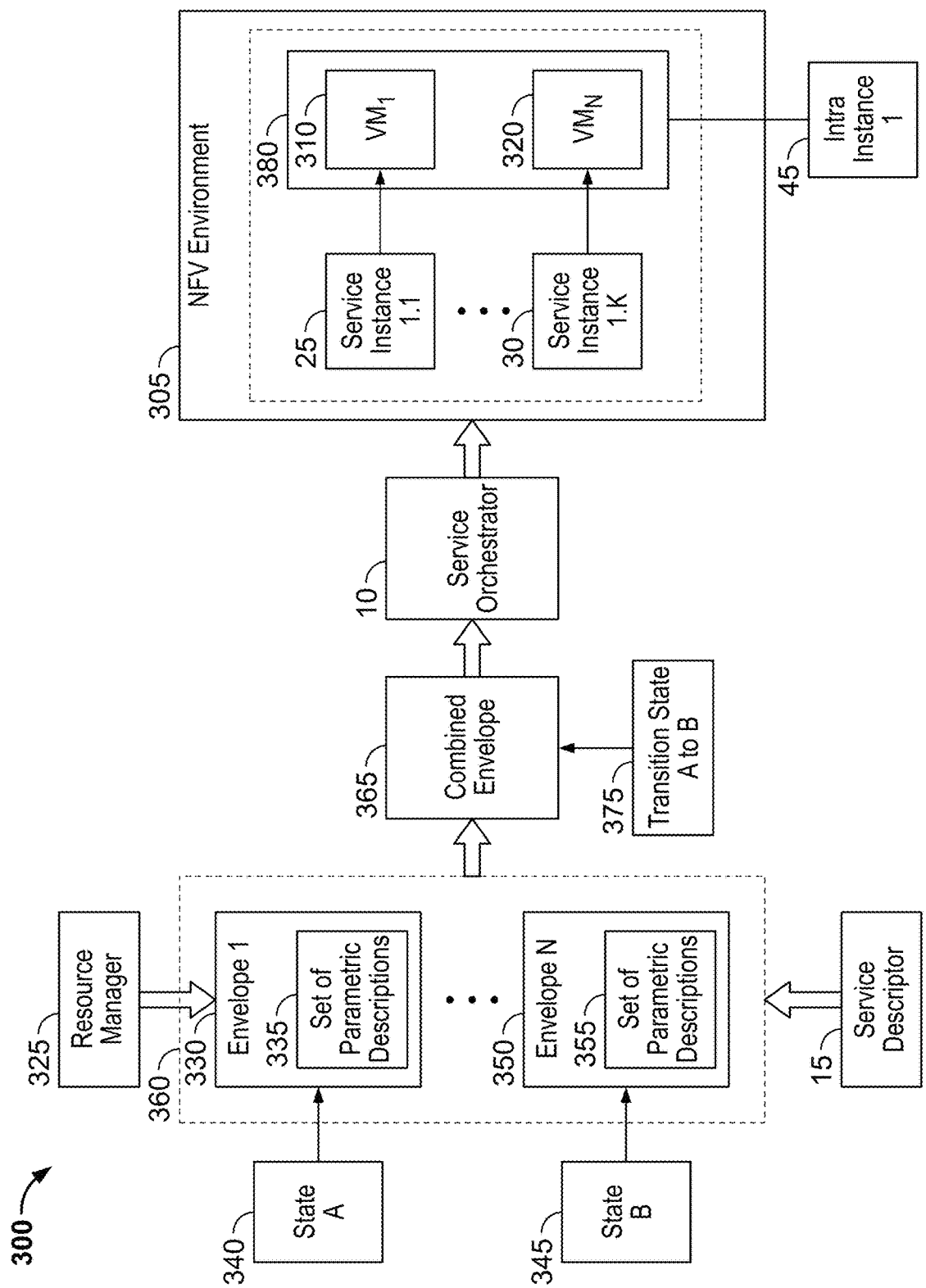
FIG. 3 illustrates an example diagram of a network function of a network system (e.g., including a virtualization) of an exemplary cloud system architecture that virtualizes network functions for a container in a cloud system for deploying a model using the set of envelopes that encapsulate and manage service operations in the NFV environment according to some embodiments.

FIG. 3 illustrates an example diagram of a network function of a network system (e.g., including a virtualization) of an exemplary cloud system 300 architecture that virtualizes network functions for a container in a cloud system for deploying a model using the set of envelopes that encapsulate and manage service operations in the NFV environment according to some embodiments. The example cloud system 300 includes a resource manager 325 that manages a set of resources and constraints in the NFV containerized environment 305. The NFV envelopes 360 (e.g., the "envelopes") each list one or more parametric descriptors 15 that are used to deploy a model to instantiate the containers based on policies and parameter configurations. For example, envelope 1 (330) may include a set of parameters represented by a set of parametric descriptors 335 that define a transitional state (State A) 340. Likewise, another series of envelopes may define other transitions or states of the cloud system.

For example, a transitional state B 345 may be defined by envelope N 350 which includes a set of parameters represented by parametric descriptors 355. A transition of the system from state A to state B may be represented by a combined envelope 365 that encapsulates both the metadata of the parametric descriptor set that defines the state transition and the parameters or configuration information that deploy the model to manage the NFV characteristics. In some embodiments, the combined envelope 365 may be a system envelope that expresses the relationships between the output service level and input resources during and after each operation. For example, by creating a combined envelope 365 that determines what the envelope is for the entire system. In some embodiments, the combined envelope 365 defines a path from state A to state B where the combined envelope 365 of the change is within a defined operational constraint. In the NFV environment, container 380 may be defined as a model deployed of the characterizations by a vendor of certain services that have been encoded as a function of input parameters encapsulated by the envelopes (i.e., envelopes 1 . . . N).

In an embodiment, the combined envelope 365 deploys a model of service operations to be orchestrated by the service orchestrator 10.

In an embodiment, the service orchestrator 10 configures the NFV containerized environment 305 that consists of a set of service instances, service instance 1.1. (25) to service instance 1.k (30). The service orchestrator 10 analyzes the service descriptors contained in the system envelope 365 and may modify instances of the service using the operation and functions provided by the service descriptors. In an embodiment, one or more service instances may configure service operations of one or more virtual machines (VMs) of $VM_1$ 310 . . . $VM_N$ 320 of an intra instance 1 (45).

For example, a cloud system may initiate a container 380 in an NFV containerized environment 305 by orchestrating an initial set of steps that may include a security scanning operation in which an example container 380 may be checked for compliance and security policies to ensure threats such as malware are non-existent before a deployment. After the security scan, container 380 may be positioned in the cloud infrastructure (e.g., the NFV containerized environment 305), and deployed based on the resource availability determined by a resource manager 325, usage requirements, and load balancing to predicted load demand. After positioning, container 380 may be initialized and instantiated to accept incoming requests and service operations.

In an embodiment, one or more parameters may be specified for the container 380 operation. For example, in an exemplary envelope (e.g., envelope 1 (330)), a single parameter may be considered to meet a memory usage constraint. This parameter specifies the maximum amount of memory that the container can utilize and may ensure that the container does not exceed its allocated memory resources, which helps prevent performance degradation and resource contention with other containers running on the same host.

For instance, if the memory usage constraint for container 380 is set to 16 GB, the cloud system ensures that the container's memory usage does not exceed this limit during its operation. This constraint can therefore be enforced through a resource allocation mechanism provided by the cloud platform, such as container resource limits or memory quotas.

In an embodiment, before a state transition (e.g., the transition from state A to B (transitional states 375)) defined by an envelope (e.g., envelope 1 (330)), no memory is consumed by container 380. After a transition, the memory being consumed is a minimum amount based on the container's memory requirements. During the transition, the memory used is at a higher amount. For example, memory usage for a virus scan operation consumed by the virus scanner may be constrained to about 16 GB of memory.

In an embodiment, the envelope (e.g., envelope 1 (330)), in this case, a designated memory envelope may be configured for this transition and can be represented as max(0, 16 GB, container-memory). The properties of the before and after states are inputs to the envelope calculation. Additional parameters may also be configured that specify aspects of the transition as it is being conducted (e.g., 'run the virus scanner slower and using less memory'—which is not a part of the resulting state, but it does change the arrival properties of the memory at the resultant state). An envelope may also include other operational or transitional constraints, for instance, the CPU quantity required, the maximum duration of the transition, or even a minimum and maximum duration.

In an example, an envelope (e.g., envelope 1 (330)), may configure multiple transitional states 375; In one example, the envelope may be established for two changes that can be executed sequentially (or serially). For instance, a memory envelope configured with changes A (state A 340) and B (State B 345) in combination, the combined changes may be represented as (max(mem(A), mem(B)) if executed sequentially, or with large memory allocations if executed in parallel. The duration of a transition of the envelope may be represented as duration(A)+duration(B) if the envelopes are executed sequentially or max(duration(A), duration(B)) if the envelopes are executed in parallel. The memory envelope allocated for each change may be designed as the maximum of the memory requirements that can be allocated for each change, and the duration can be configured as a sum of the durations of each change. In some embodiments, executing one or more changes in parallel may increase the memory requirements, so the memory envelope would be required to allocate higher amounts of memory, and the duration for each change would be configured at a maximum threshold of the duration for each change.

In some embodiments, using a data language defined for an objective in which a description can be written of each transition available in an instantiation process or device configuration under control. For instance, in a cloud system 300 in which transitions can be defined using the data language may include starting and stopping a container 380; in the router device, transitions that may be defined using the data language may be covered and include adding and removing a Border Gateway Protocol (BGP) peer. The language can also specify how transitions will be combined by this particular device when state changes are made at the same time. For example, a domain-specific language (DSL) for specifying transitions and state changes in various devices or systems. For example, in the context of a cloud system 300, the DSL might define transitions such as starting and stopping containers 380, scaling resources up or down, deploying new services, etc. In a router or networking device, transitions could include adding or removing BGP peers, updating routing tables, configuring access control lists, and so on.

Based on these descriptors of the service operation, it can be determined whether the envelope will configure for a regular or an arbitrary transition by combining the individual transitions in different ways using transition rules. For example, when a state is to be changed, the state change itself may identify the envelope associated with the change (time, memory, etc.). When providing a new state change, a programming entity may specify a system that dictates control over when the transition occurs (e.g., by minimizing memory, minimizing time, by operating within a certain duration). In an embodiment, the system may reject the state change if the transition properties cannot be met (e.g., it would be impossible to perform the state change within the given requirements). It may also be possible to inquire as to the feasibility of a combined envelope for a transition or change, with associated transition properties, based on the domain-specific language (DSL) specification associated with a device or system, if the device or system behavior is incompatible with a particular transitional change.

Figure 4:
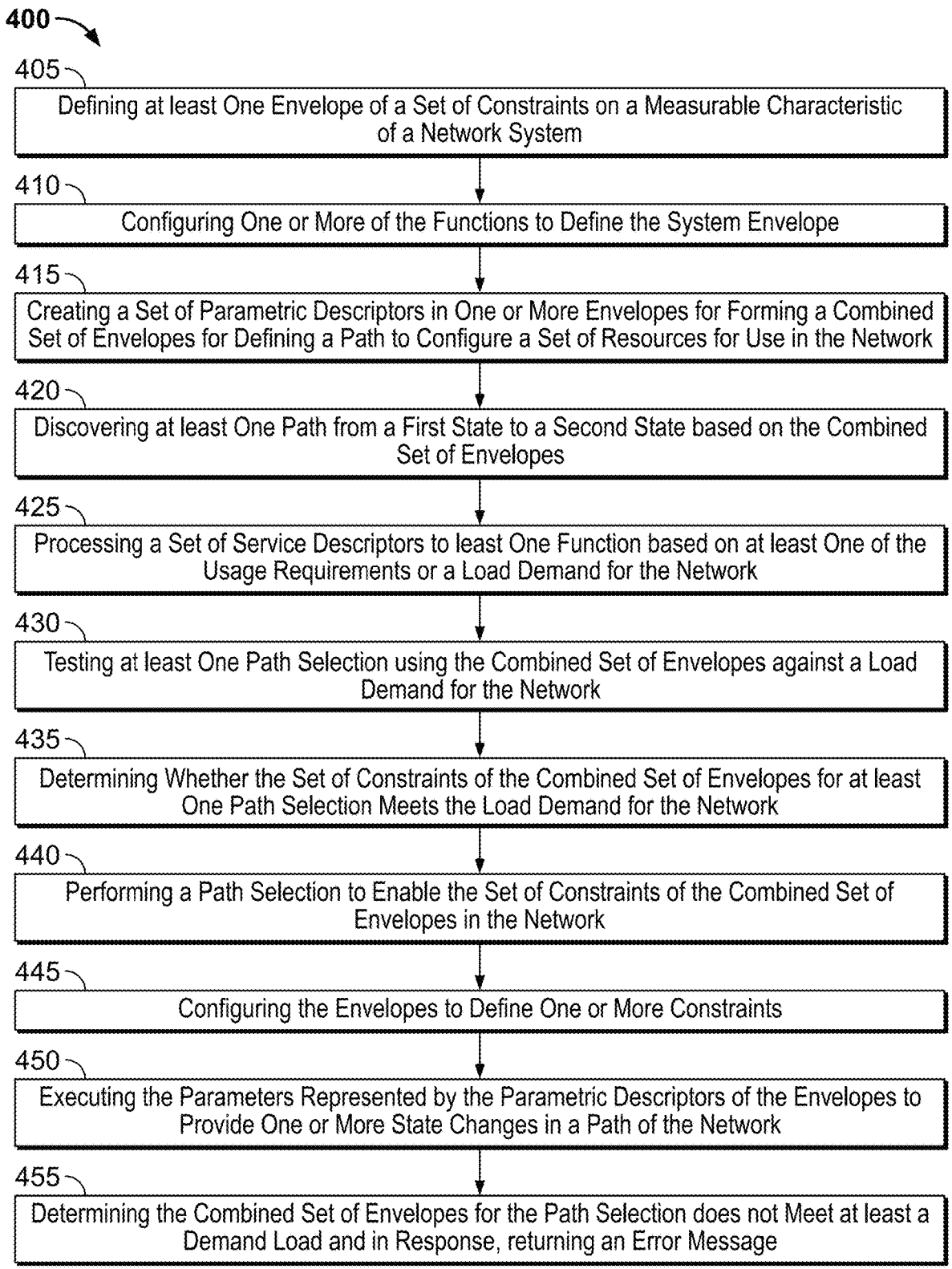
FIG. 4 illustrates an exemplary flow chart of the operations depicted in FIGS. 1-3, for processing a set of instantiations of one or more virtual network functions in a cloud computing infrastructure that can include constraints associated with a set of computing resources and storage resources, according to some embodiments.

A set of requirements for an example service, with parametric descriptors for deploying a model may be represented as follows:

The Example Service:
A function that provides authentication for a population of users and can support transactions at a certain TPS and provides: t TPS of service "authentication" for s sessions, includes the following resources, operational state with parameters and parametric descriptors for starting, fast upgrading, slow upgrading, and stopping as follows:
requires:
m GB of RAM
1 Gbps speed Link vCPUs
operations:
START:
before:
allowed_states: non_existent during:
after:
resulting_states: operational, failed operational @(s, t) were
s=(m−1)*10^8
t=min ((v−1)*100, 1/(5*10^6))
FAST_UPGRADE:
before:
allowed_sates: operational s_existing, t_existing
during:
operational @(s, t) were
s=((m−1)*10^8)/2
t=min ((v−1)*50, 1/(5*10^6))
estimated time=s_existing/(5*10^6) seconds after:
resulting_states: operational, failed operational @(s, t) were
s=(m−1)*10^8
t=min ((v−1)*100, 1/(5*10^6))
SLOW_UPGRADE:

before:
allowed states: operational s_existing, t_existing
during:
operational @(s, t) were
s=((m−1)*10^8)
t=min ((v−1)*10, 1/(5*10^6))*0.95
estimated time=s_existing/10^6 seconds after:
resulting_states: operational, failed operational @(s, t) were
s=(m−1)*10^8
t=min ((v−1)*100, 1/(5*10^6))
STOP:
before:
allowed_states: operational, failed s_existing, t_existing
during:
estimated time=15 seconds after:
resulting_states: non-existent, failed Example Processes:

FIG. 4 illustrates an exemplary flow chart of the operations depicted in FIGS. 1-3, to a process 400 that involves instantiating one or more virtual network functions in a cloud computing infrastructure that includes computing resources and storage resources, according to some embodiments. The process 400 is performed by an orchestration entity that is configured to instantiate one or more virtual network functions in a cloud computing infrastructure.

The methods illustrated in FIG. 4 are described hereinafter with respect to the components of the example operating environment 100. The method of FIG. 4 may also be performed with other systems and in other environments. The operations described with respect to FIG. 4 can be implemented as executable code stored on a computer or machine-readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The process of FIG. 4, at step 405 is initiated with the defining of at least one envelope that defines a set of constraints that is imposed on a measurable characteristic of a network system such as a cloud system. The envelope imposes the characteristics based on two perspectives, an outside perspective of what the system may consume, and an inside perspective of what the system may produce. As a result of the multi-facet approach, an operator may create one or more envelopes for a maximum threshold such as the maximum number of resources that the system may consume. Alternatively, the operator may create another envelope for the minimum transactions per second supported or produced by the system. At step 410, one or more of the functions may be combined to define the system envelope. The system envelope defines an end-to-end solution or path for processing a set of service descriptors that comprise functional equations connecting the consumption and production values of the system and testing these values against envelope constraints. The system envelope may be considered a vendor characterization of the services promoted and enabling the encoding of the service level objectives as a function of the input parameters. The envelopes that make up the system envelope may comprise all or most of the operations that are permissible in the system.

At step 415, the set of parametric descriptors in one or more envelopes that have been created, enable the system to create one or more functions to form a combined set of envelopes that both define a path and can be used to configure a set of resources for use in the network. At step 420, the service orchestrator is configured to discover at least one path from a first state to a second state based on the combined set of envelopes. The path represents a state change within one or more operational constraints defined by the combined set of envelopes for the network. In some embodiments, the service orchestrator 10 may be configured to capture when deploying the model with the parametric descriptions, a set of requirements using declarations for shared resources.

The service orchestrator 10 may perform the modeling of the state changes that define an envelope of transitional changes as a service model which may consist of two levels, at one level that is a cluster level and at another level that is a client service level. The service orchestrator 10 based on the input of the service design and characterization 20 may configure the system to estimate the time it takes for a transition. At step 425, the service orchestrator 10 may process a set of service descriptors to configure at least one function based on at least one of the usage requirements or a load demand for the network. At step 430, the service orchestrator 10 may test at least one path selection using the combined set of envelopes against a load demand for the network. In this case, one or more operational constraints for testing a path selection are defined within the set of constraints of the combined set of envelopes. Also, the envelope may enable a set of transitions for the changes that include a set of states of the system that can be represented by (i) a set of operations that transitions between the states; and (ii) a set of functions that expresses the relationship between the output service level indicators and the input resources of the system both during and after each.

At step 435, the service orchestrator may determine whether the set of constraints of the combined set of envelopes for at least one path selection meets the load demand for the network. The service orchestrator 10 takes the input of current system constraints and requirements for the service and brings up or modifies instances of the service using the operation and functions provided in the service descriptor 15 based on inputted information of the service design and characterization 20 that is the characterized service by a vendor and encodes the relationship of the service objectives as a function of the input parameters that include the system constraints and requirements 5 from the operator 5, and it is in every operation permissible to the system and the encoded om the service descriptor 15. At step 440, in response to the combined set of envelopes meeting the load demand for the network, the service orchestrator may perform a path selection to enable the set of constraints of the combined set of envelopes in the network. The combined set of envelopes set defines a system envelope, and at least one envelope defines at least one constraint associated with at least one characteristic of the network. The envelope is configured to use at least one resource of a plurality of resources within the network and may define at least one constraint that provides a maximum number of resources to be consumed by the network.

At step 445, the envelopes may be configured in a multitude of ways to define one or more constraints. For example, the envelope may define at least one constraint that provides a minimum number of resources to be consumed by the network. As step 450, the envelopes are configured in the system to sequentially execute a plurality of envelopes in a path selection to provide one or more state changes in a path of the network. The envelope is configured with input and represented by a parametric descriptor set that defines one or more constraints-related operating characteristics of the network. Also, the service orchestrater analyzes the set of service descriptors and stores an internal representation of the service to be executed by the network.

At step 455, the service orchestrator is configured in response to a determination that the combined set of envelopes for the path selection does not meet at least a demand load, to return an error message to a network provider. operation.

Figure 5:
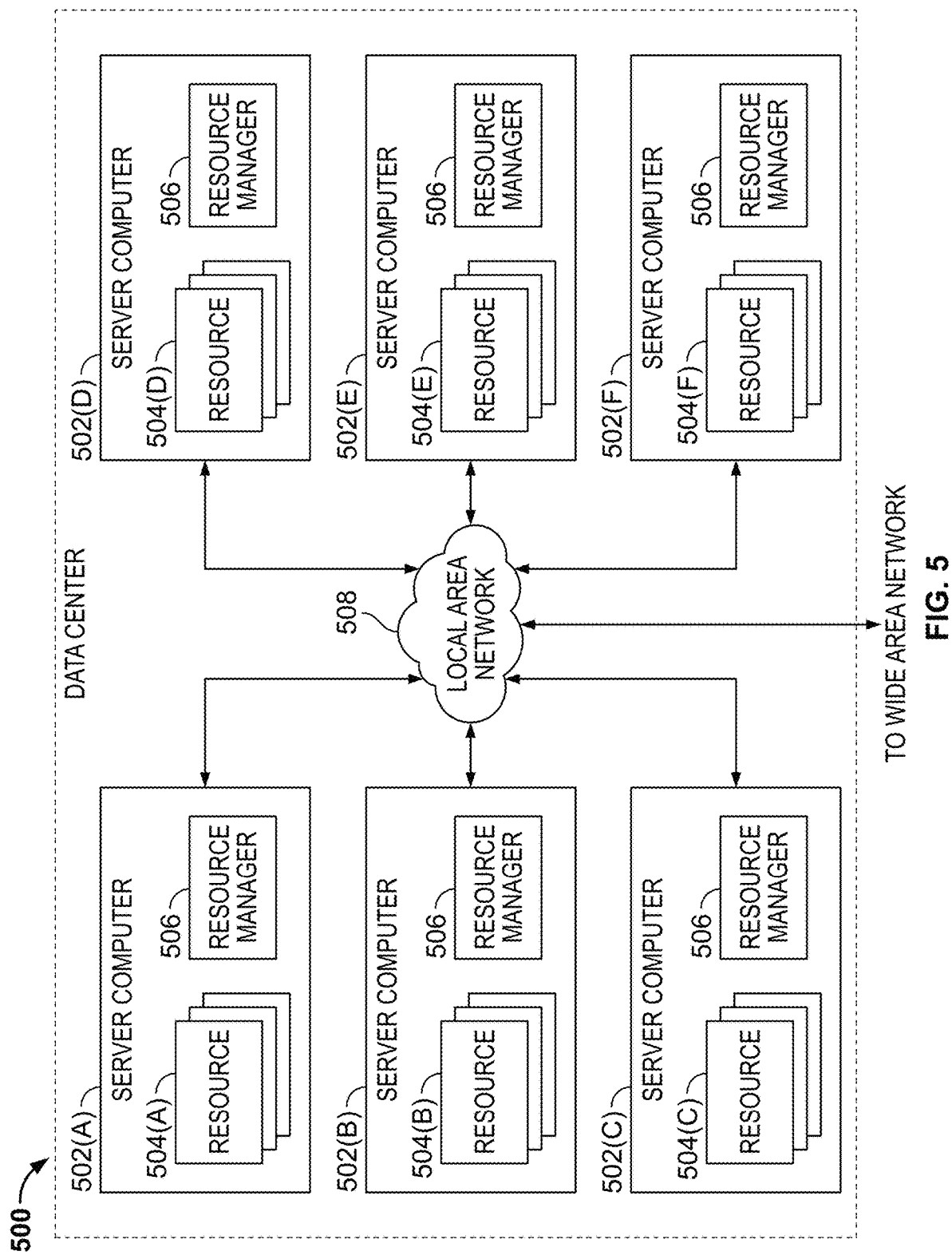
FIG. 5 illustrates a computing system diagram of an exemplary architecture for a data center that may be utilized according to some embodiments.

FIG. 5 illustrates a computing system diagram illustrating a configuration for a Data Center 500 that may be utilized to implement aspects of the technologies disclosed herein. The example Data Center 500 shown in FIG. 5 includes several server computers 502A-502F (which might be referred to herein singularly as "a server computer 502" or in the plural as "the server computers 502) for providing computing resources. In some examples, the resources and/or server computers 502 may include, or correspond to, any type of component, system, or device described herein. Although described as servers, server computers 502 may comprise any type of networked devices, such as servers, switches, routers, hubs, bridges, gateways, modems, repeaters, access points, etc. The device referred to here, may include any computing resources to the network such as data processing, data storage, and resource sharing.

The server computer 502 may be a standard tower, rackmount, or blade server computer configured appropriately for providing computing resources. In some examples, server computers 502 may provide computing resources 504 including data processing resources such as VM instances and containers (of FIGS. 1-4) or hardware computing systems, database clusters, computing clusters, storage clusters, data storage resources, database resources, networking resources, virtual private networks (VPNs), and others. Some of the server computers 502 may also be configured to execute a resource manager 506 capable of instantiating and/or managing the computing resources. In the case of VM instances, for example, the resource manager 506 may be a hypervisor or another type of program configured to enable the execution of multiple VM instances on a single server computer 502. Server computer 502 in the Data Center 500 may also be configured to provide network services and other types of services.

In the example, Data Center 500 shown in FIG. 5, an appropriate Local Area Network (LAN) 508 may also be utilized to interconnect the server computers 502A-502F. It may be appreciated that the configuration and network topology described herein have been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between Data Centers 500, between each of the server computers 502A-502F in each Data Center 500, and, potentially, between computing resources in each of the server computers 502. It may be appreciated that the configuration of the Data Center 500 described with reference to FIG. 5 is merely illustrative and that other implementations may be utilized.

In some examples, the server computers 502 and or computing resources 504 may each execute/host one or more tenant containers and/or virtual machines to perform techniques described herein.

In some instances, the Data Center 500 may provide computing resources, like tenant containers, VM instances, VPN instances, and storage, on a permanent or as-needed basis. Among other types of functionality, the computing resources provided by a cloud computing network may be utilized to implement the various services and techniques described herein. The computing resources 504 provided by the cloud computing network may include various types of computing resources, such as data processing resources like tenant containers and VM instances, data storage resources, networking resources, data communication resources, network services, VPN instances, and the like.

Each type of computing resource 504 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 504 not mentioned specifically herein.

The computing resources 504 provided by a cloud computing network may be enabled in one example by one or more Data Centers 500 (which might be referred to herein singularly as "a Data Center 500" or in the plural as "the Data Centers 500). The Data Centers 500 are facilities utilized to house and operate computer systems and associated components. The Data Centers 500 typically includes redundant and backup power, communications, cooling, and security systems. The Data Centers 500 may also be located in geographically disparate locations and are one illustrative example of a Data Center 500 that may be utilized to implement the technologies disclosed herein and described herein with regard to, for example, FIGS. 1 through 4.

Figure 6:
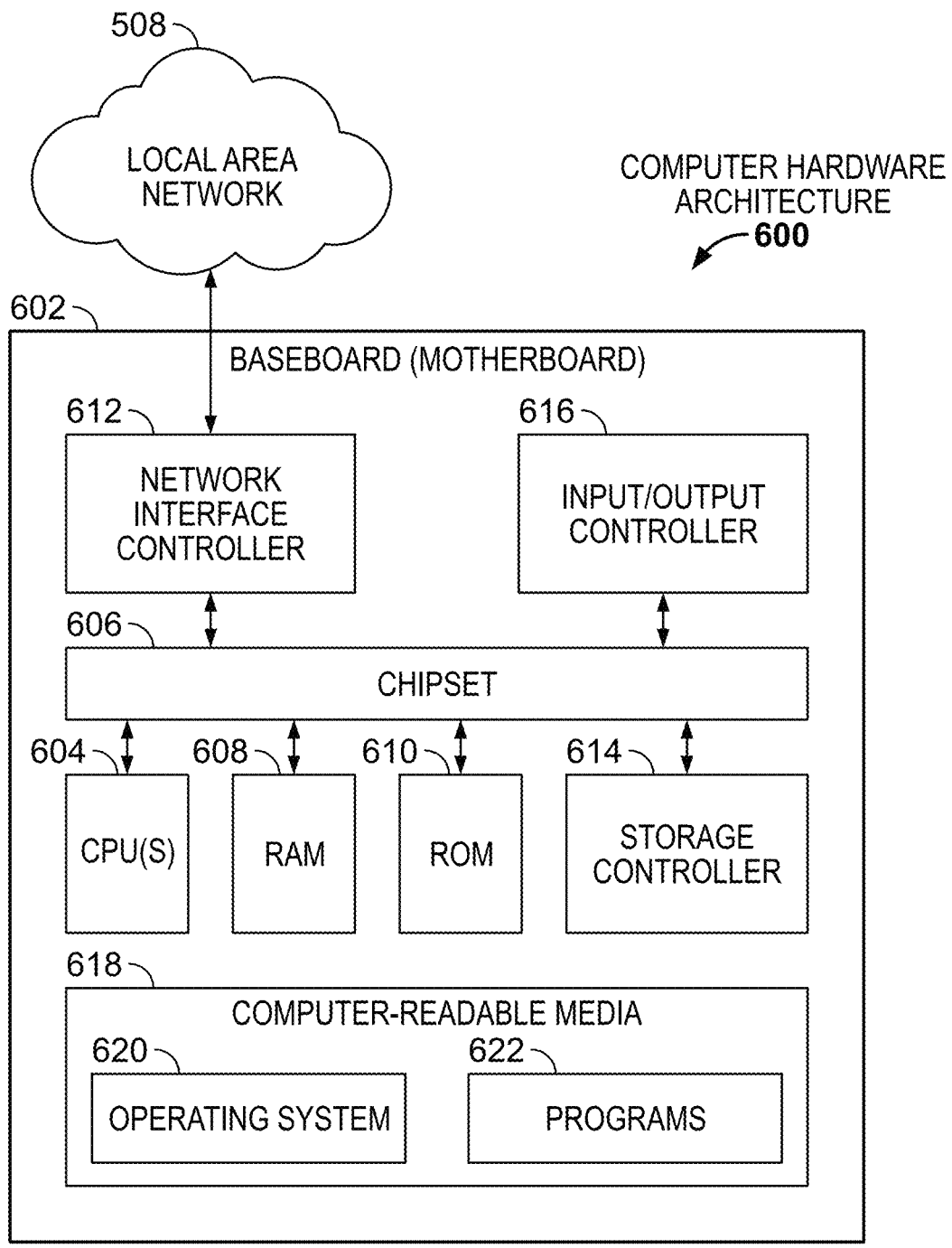
FIG. 6 illustrates a computer architecture diagram of an exemplary computer hardware architecture for implementing a computing device that may be utilized to implement aspects of the cloud systems in FIGS. 1-5 according to some embodiments.

FIG. 6 illustrates a computer architecture diagram showing an example of computer hardware architecture 600 for implementing a computing device that may be utilized to implement aspects of the various technologies presented herein. The example computer hardware architecture ("computer") 600 shown in FIG. 6 illustrates the orchestrating computing devices (service orchestrator 10), computing devices within a network and/or a workstation, a desktop computer, a laptop, a tablet, a network appliance, an e-reader, a smartphone, or other computing device, and may be utilized to execute any of the software components described herein. The computer 600 may, in some examples, correspond to a device such as a service orchestrator 10 described herein, and may also include other devices such as servers, switches, routers, hubs, bridges, gateways, modems, repeaters, access points, etc.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPU 604 may be a standard programmable processor that performs arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPU 604 and the remainder of the components and devices on the baseboard 602. The chipset 606 may provide an interface to a RAM 608, used as the main memory in the computer 600. The chipset 606 may further provide an interface to a computer-readable storage medium such as read-only memory (ROM) 610 or non-volatile RAM (NVRAM) for storing basic routines that help to startup the computer 600 and to transfer information between the various components and devices. The ROM 610 or NVRAM may also store other software components necessary for the operation of the computer 600 in accordance with the configurations described herein.

The computer 600 may operate in a networked environment using logical connections to remote computing devices and computer systems through a network. The chipset 606 may include functionality for providing network connectivity through a Network Interface Controller (NIC) 612, such as a gigabit Ethernet adapter. The NIC 612 is capable of connecting the computer 600 to other computing devices within the SNIC 504 and external to the SNIC 504. It may be appreciated that multiple NICs 612 may be present in the computer 600, connecting the computer to other types of networks and remote computer systems.

The computer 600 may be connected to a storage device 618 that provides non-volatile storage for the computer. The storage device 618 may store an operating system 620, programs 622 (e.g., any computer-readable and/or computer-executable code described herein), and data, which have been described in greater detail herein. The storage device 618 may be connected to the computer 600 through a storage controller 614 connected to the chipset 606. The storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the storage device 618 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 618 is characterized as primary or secondary storage, and the like.

For example, computer 600 may store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from storage device 618 by detecting the physical states or characteristics of one or more particular locations within the physical storage units.

In addition to the storage device 618 described above, the computer 600 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 600.

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 618 may store an operating system 620 utilized to control the operation of the computer 600. According to one example, the operating system 620 comprises the LINUX® operating system. According to another example, the operating system comprises the WINDOWS® Server operating system from MICROSOFT® Corporation of Redmond, Washington. According to further examples, the operating system may comprise the UNIX® operating system or one of its variants. It may be appreciated that other operating systems may also be utilized. The storage device 618 may store other system or application programs and data utilized by the computer 600.

In one example, the storage device 618 or other computer-readable storage media is encoded with computer-executable instructions which, when loaded into the computer 600, transform the computer from a general-purpose computing system into a special-purpose computer capable of implementing the examples described herein. These computer-executable instructions transform the computer 600 by specifying how the CPU 604 transitions between states, as described above. According to one example, the computer 600 has access to computer-readable storage media storing computer-executable instructions which, when executed by the computer 600, perform the various processes described above with regard to FIGS. 1 through 6. The computer 600 may also include computer-readable storage media having instructions stored thereupon for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, an input/output controller 616 may provide output to a display, such as a computer monitor, a flat-panel display, a digital projector, a printer, or other type of output device. It will be appreciated that the computer 600 might not include all of the components shown in FIG. 6, may include other components that are not explicitly shown in FIG. 6, or might utilize an architecture completely different than that shown in FIG. 6.

As described herein, the computer 600 may include one or more hardware processor(s) such as the CPU 604 configured to execute one or more stored instructions. The CPU 604 may comprise one or more cores. Further, the computer 600 may include one or more network interfaces configured to provide communications between the computer 600 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi®, and so forth. Programs 622 may comprise any type of program or process to perform the techniques described in this disclosure. Programs 622 may enable the devices described herein to perform various operations.

Clause 1. A method, comprising: defining at least one envelope that comprises a set of operational constraints of a network; creating at least one function for forming a combined set of envelopes based on the at least one envelope to configure a set of resources for use in the network; discovering at least one path from a first state to a second state based on the combined set of envelopes wherein the at least one path represents a state change within one or more operational constraints defined by the combined set of envelopes for the network; processing a set of service descriptors to configure the at least one function based on at least one of a usage requirement or a load demand for the network; testing at least one path selection using the combined set of envelopes against a load demand for the network wherein one or more constraints for testing the at least one path selection is defined within the set of operational constraints of the combined set of envelopes; determining whether the set of operational constraints of the combined set of envelopes for at least one path selection meets the load demand for the network; and in response to the combined set of envelopes meeting the load demand for the network, performing the path selection for enabling the set of operational constraints of the combined set of envelopes in the network.

Clause 2. The method of clause 1, wherein the combined set of envelopes set defines a system envelope.

Clause 3. The method of clause 1, wherein the at least one envelope defines at least one operational constraint associated with at least one characteristic of the network.

Clause 4. The method of clause 1, wherein the at least one envelope is configured to use at least one resource of a plurality of resources within the network.

Clause 5. The method of clause 1, wherein the at least one envelope defines at least one operational constraint that provides a maximum number of resources to be consumed by the network.

Clause 6. The method of clause 1, wherein the at least one envelope defines at least one operational constraint that provides a minimum number of resources to be consumed by the network.

Clause 7. The method of clause 1, further comprising sequentially executing a plurality of envelopes in a path selection to provide one or more state changes in a path of the network.

Clause 8. The method of clause 1, wherein the at least one envelope is configured with an input that defines one or more operational constraints related to an operating characteristic of the network.

Clause 9. The method of clause 1, wherein at least one function is configured by a service orchestrater to analyze the set of service descriptors and to store an internal representation of a service to be executed by the network.

Clause 10. The method of clause 1, further comprising: in response to a determination that the combined set of envelopes for the path selection does not meet at least the load demand for the network, returning an error message to a network provider.

Clause 11. A computer programming product, comprising: a non-transitory computer-readable medium having computer-readable program instructions embodied thereon, the computer-readable program instructions comprising: computer-readable program instructions to define, by a computing device, at least one envelope that comprises a set of constraints of a network; computer-readable program instructions to create, by the computing device, at least one function to form a combined set of envelopes based on at least one envelope to configure a set of resources for use in the network; computer-readable program instructions to discover, by the computing device, at least one path from a first state to a second state based on the combined set of envelopes wherein the at least one path represents a state change within one or more operational constraints defined by the combined set of envelopes for the network; computer-readable program instructions to process, by the computing device, a set of service descriptors to configure the at least one function based on at least one of a usage requirement or a load demand for the network; computer-readable program instructions to test, by the computing device, at least one path selection using the combined set of envelopes against a load demand for the network wherein one or more operational constraints for testing the at least one path selection is defined within the set of constraints of the combined set of envelopes; and computer-readable program instructions to determine, by the computing device, whether the set of constraints of the combined set of envelopes for at least one path selection meets the load demand for the network; and. computer-readable program instructions to perform, by the computing device, the path selection for enabling the set of constraints of the combined set of envelopes in the network in response to the combined set of envelopes meeting the load demand for the network.

Clause 12. The computer programming product of clause 11, wherein the computing device orchestrates a set of functions to analyze the set of service descriptors and to store an internal representation of a service to be executed by the network.

Clause 13. The computer programming product of clause 11, wherein the combined set of envelopes set defines a system envelope.

Clause 14. The computer programming product of clause 11, wherein the at least one envelope defines at least one constraint associated with at least one characteristic of the network.

Clause 15. The computer programming product of clause 11, further comprising computer-readable instructions to: return, by the computing device, an error message in response to a determination that the combined set of envelopes for at least one path selection does not meet at least the load demand for a network.

Clause 16. The computer programming product of clause 11, wherein the at least one envelope defines at least one constraint that provides a minimum number of resources to be consumed by the network.

Clause 17. The computer programming product of clause 11, wherein the at least one envelope defines at least one constraint that provides a maximum number of resources to be consumed by the network.

Clause 18. A system, comprising: a storage device; and at least one processor communicatively coupled to the storage device, wherein the at least one processor executes application code instructions that are stored in the storage device to cause the system to: define an envelope as comprising a set of constraints of a network; create at least one function to form a combined set of envelopes from at least one envelope that configures a set of resources for use in the network; discover at least one path from a first state to a second state based on the combined set of envelopes wherein the at least one path represents a state change within one or more operational constraints defined by the combined set of envelopes for the network; process a set of service descriptors to configure the at least one function based on at least one of a usage requirement or a load demand for the network; determine whether the set of constraints of the combined set of envelopes for at least one path selection meets the load demand for the network; and in response to the combined set of envelopes meeting the load demand for the network, perform at least one path selection to enable the set of constraints of the combined set of envelopes in the network.

Clause 19. The system of clause 18, further comprising: wherein the at least one processor executes application code instructions that are stored in the storage device to cause the system to: test at least one path selection using the combined set of envelopes against the load demand for the network wherein one or more operational constraints for testing the at least one path selection are defined within the set of constraints of the combined set of envelopes.

Clause 20. The system of clause 18, further comprising: wherein the at least one processor executes application code instructions that are stored in the storage device to cause the system to: in response to a determination that the combined set of envelopes for at least one path selection does not meet at least the load demand, return an error message to a network provider.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated descriptions in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGAs"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation to encompass such modifications and equivalent structures.

What is claimed is:

1. A system comprising a non-transitory machine-readable storage medium that provides instructions that, if executed by a processor, are configurable to cause the processor to perform operations, comprising:
    defining at least one envelope that comprises a set of operational constraints of a network;
    creating at least one function for forming a combined set of envelopes based on the at least one envelope to configure a set of resources for use in the network wherein at least one function is configured to analyze a set of service descriptors and to store an internal representation of a service to be executed by the network;
    discovering at least one path from a first state to a second state based on the combined set of envelopes wherein the at least one path represents a state change within one or more operational constraints defined by the combined set of envelopes for the network;
    processing the set of service descriptors to configure the at least one function based on at least one of a usage requirement or a load demand for the network;
    testing at least one path selection using the combined set of envelopes against a load demand for the network wherein one or more constraints for testing the at least one path selection is defined within the set of operational constraints of the combined set of envelopes;
    determining whether the set of operational constraints of the combined set of envelopes for at least one path selection meets the load demand for the network; and
    in response to the combined set of envelopes meeting the load demand for the network, performing the path selection for enabling the set of operational constraints of the combined set of envelopes in the network.

2. The system of claim 1, wherein the combined set of envelopes set defines a system envelope.

3. The system of claim 1, wherein the at least one envelope defines at least one operational constraint associated with at least one characteristic of the network.

4. The system of claim 1, wherein the at least one envelope is configured to use at least one resource of a plurality of resources within the network.

5. The system of claim 1, wherein the at least one envelope defines at least one operational constraint that provides a maximum number of resources to be consumed by the network.

6. The system of claim 1, wherein the at least one envelope defines at least one operational constraint that provides a minimum number of resources to be consumed by the network.

7. The system of claim 1, further comprising sequentially executing a plurality of envelopes in a path selection to provide one or more state changes in a path of the network.

8. The system of claim 1, wherein the at least one envelope is configured with an input that defines one or more operational constraints related to an operating characteristic of the network.

9. The system of claim 1, further comprising:
in response to a determination that the combined set of envelopes for the path selection does not meet at least the load demand for the network, returning an error message to a network provider.

10. A computer device, comprising:
a non-transitory computer-readable medium having computer-readable program instructions embodied thereon, wherein when the computer-readable program instructions being executed by the computer device, causing the computer device to:
define at least one envelope that comprises a set of constraints of a network;
create at least one function to form a combined set of envelopes based on at least one envelope to configure a set of resources for use in the network wherein at least one function is configured to analyze a set of service descriptors and to store an internal representation of a service to be executed within the network;
discover at least one path from a first state to a second state based on the combined set of envelopes wherein the at least one path represents a state change within one or more operational constraints defined by the combined set of envelopes for the network;
process the set of service descriptors to configure the at least one function based on at least one of a usage requirement or a load demand for the network;
test at least one path selection using the combined set of envelopes against a load demand for the network wherein one or more operational constraints for testing the at least one path selection is defined within the set of constraints of the combined set of envelopes; and
determine whether the set of constraints of the combined set of envelopes for at least one path selection meets the load demand for the network; and
perform the path selection for enabling the set of constraints of the combined set of envelopes in the network in response to the combined set of envelopes meeting the load demand for the network.

11. The computer device of claim 10, wherein the combined set of envelopes set defines a system envelope.

12. The computer device of claim 10, wherein the at least one envelope defines at least one constraint associated with at least one characteristic of the network.

13. The computer device of claim 10, wherein when the computer-readable program instructions being executed by the computer device, causing the computer device to:
return an error message in response to a determination that the combined set of envelopes for at least one path selection does not meet at least the load demand for a network.

14. The computer device of claim 10, wherein the at least one envelope defines at least one constraint that provides a minimum number of resources to be consumed by the network.

15. The computer device of claim 10, wherein the at least one envelope defines at least one constraint that provides a maximum number of resources to be consumed by the network.

16. A system, comprising:
a storage device; and
at least one processor communicatively coupled to the storage device, wherein when the at least one processor executes application code instructions that are stored in the storage device, causing the at least one processor to:
define an envelope as comprising a set of constraints of a network wherein at least one envelope is configured with an input that defines one or more operational constraints related to an operating characteristic of the network;
create at least one function to form a combined set of envelopes from the at least one envelope that configures a set of resources for use in the network;
discover at least one path from a first state to a second state based on the combined set of envelopes wherein the at least one path represents a state change within one or more operational constraints defined by the combined set of envelopes for the network;
process a set of service descriptors to configure the at least one function based on at least one of a usage requirement or a load demand for the network;
determine whether the set of constraints of the combined set of envelopes for at least one path selection meets the load demand for the network; and
in response to the combined set of envelopes meeting the load demand for the network, perform at least one path selection to enable the set of constraints of the combined set of envelopes in the network.

17. The system of claim 16, further comprising:
wherein when the at least one processor executes application code instructions that are stored in the storage device, causing the at least one processor to:
test at least one path selection using the combined set of envelopes against the load demand for the network wherein one or more operational constraints for testing the at least one path selection are defined within the set of constraints of the combined set of envelopes.

18. The system of claim 16, further comprising:
wherein when the at least one processor executes application code instructions that are stored in the storage device, causing the at least one processor to:
in response to a determination that the combined set of envelopes for at least one path selection does not meet at least the load demand, return an error message to a network provider.

19. The system of claim 16, wherein the at least one envelope defines at least one constraint that provides a minimum number of resources to be consumed by the network.

20. The system of claim 16, wherein the at least one envelope defines at least one constraint that provides a maximum number of resources to be consumed by the network.

* * * * *